United States Patent
Blanchard et al.

(10) Patent No.: US 10,026,510 B2
(45) Date of Patent: Jul. 17, 2018

(54) PROCESS FOR THE SYNTHESIS OF A MIXED PEROXIDE OR HYDROXO-PEROXIDE OF AN ACTINYL AND OF AT LEAST ONE DOUBLY, TRIPLY OR QUADRUPLY CHARGED METAL CATION, MIXED PEROXIDE OR HYDROXO-PEROXIDE THUS OBTAINED AND USES THEREOF

(71) Applicant: Orano Cycle, Courbevoie (FR)

(72) Inventors: Florent Blanchard, Saint Barthelemy D'Anjou (FR); Francis Abraham, Genech (FR); Stéphane Grandjean, Saint Marcel de Careiret (FR); Nicolas Vigier, Moret sur Loing (FR); Isabelle Hablot, Carriere sur Seine (FR); Murielle Rivenet, Baisieux (FR)

(73) Assignee: Orano Cycle, Courbevoie (FR)

( * ) Notice: Subject to any disclaimer, the term of this patent is extended or adjusted under 35 U.S.C. 154(b) by 0 days.

(21) Appl. No.: 15/104,787

(22) PCT Filed: Dec. 18, 2014

(86) PCT No.: PCT/EP2014/078400
§ 371 (c)(1),
(2) Date: Jun. 15, 2016

(87) PCT Pub. No.: WO2015/091753
PCT Pub. Date: Jun. 25, 2015

(65) Prior Publication Data
US 2016/0314858 A1 Oct. 27, 2016

(30) Foreign Application Priority Data
Dec. 20, 2013 (FR) .................................... 13 63261

(51) Int. Cl.
| | | |
|---|---|---|
| C01G 43/00 | (2006.01) | |
| G21C 3/62 | (2006.01) | |
| C01B 15/047 | (2006.01) | |
| G21C 19/44 | (2006.01) | |
| G21F 9/00 | (2006.01) | |
| G21F 9/30 | (2006.01) | |

(52) U.S. Cl.
CPC .......... *G21C 3/623* (2013.01); *C01B 15/0475* (2013.01); *C01G 43/00* (2013.01); *G21C 19/44* (2013.01); *G21F 9/001* (2013.01); *G21F 9/30* (2013.01); *C01P 2002/72* (2013.01); *C01P 2002/84* (2013.01); *C01P 2002/88* (2013.01); *G21Y 2004/10* (2013.01)

(58) Field of Classification Search
CPC ...... G21C 3/623; C01G 43/006; C01G 43/01; C01G 56/008; C01B 15/0475

USPC .................... 423/582, 583, 15, 16, 250, 253
See application file for complete search history.

(56) References Cited

U.S. PATENT DOCUMENTS 4,971,734 A * 11/1990 Floreancig .......... C01B 15/0475
252/5

OTHER PUBLICATIONS

Alcock, N., et al., "The Crystal and Molecular Structure of Sodium Uranyl Triperoxide", "Journal of the Chemical Society A: Inorganic, Physical, Theoretical", Dec. 1967, pp. 1588-1594.
Burns, P., et al., "Actinyl Peroxide Nanospheres", "Angew Chem. Int. Ed. Engl.", Mar. 29, 2005, pp. 2135-2139, vol. 44.
Kubatko, K., et al., "Expanding the Crystal Chemistry of Uranyl Peroxides: Synthesis and Structures of Di- and Triperoxodioxouranium(VI) Complexes", "Inorganic Chemistry", Mar. 27, 2007, pp. 3657-3662, vol. 46.
Nyman, M., et al., "Self-Assembly of Alkali-Uranyl-Peroxide Clusters", "Inorganic Chemistry", Sep. 6, 2010, pp. 7748-7755, vol. 49.
Schindler, M., et al., "The Stereochemistry and Chemical Composition of Interstitial Complexes in Uranyl-Oxysalt Minerals", "The Canadian Mineralogist", Apr. 1, 2008, pp. 467-501, vol. 46.
Sigmon, G., et al., "Uranyl-Peroxide Interactions Favor Nanocluster Self-Assembly", "J. Am. Chem. Soc.", Nov. 25, 2009, pp. 16648-16649, vol. 131.
Unruh, D., et al., "Expanding the crystal chemistry of actinyl peroxides: mu-eta2:eta1 peroxide coordination in trimers of U6+ polyhedra", "Inorganic Chemistry", Mar. 16, 2009, pp. 2349-2348, vol. 48.

* cited by examiner

*Primary Examiner* — Steven J Bos
(74) *Attorney, Agent, or Firm* — Alston & Bird, LLP

(57) ABSTRACT

A process is described for synthesizing a mixed peroxide or hydroxo-peroxide of an actinyl and at least one cation $X_1$, wherein the actinyl is a uranyl or neptunyl and the at least one cation $X_1$ is a di-, tri- or tetra-charged metal cation. This process includes the reaction in a solvent of a salt of the at least one cation $X_1$ with a compound $C_2$ selected from mixed peroxides and hydroxo-peroxides of the actinyl and of at least one singly charged cation $X_2$, whereby compound $C_2$ is converted to the peroxide or hydroxo-peroxide by replacement of the at least one cation $X_2$ by said at least one cation $X_1$. Also disclosed is a process for synthesizing a mixed oxide of an actinide selected from uranium and neptunium, and of at least one metal able to form a di-, tri- or tetra-charged cation, which implements the preceding synthesis process. The disclosure further relates to a mixed peroxide or hydroxo-peroxide of an actinyl and of at least one di-, tri- or tetra-charged metal cation, and the use thereof for the preparation of a mixed oxide of an actinide and of at least this metal.

18 Claims, 8 Drawing Sheets

PROCESS FOR THE SYNTHESIS OF A MIXED PEROXIDE OR HYDROXO-PEROXIDE OF AN ACTINYL AND OF AT LEAST ONE DOUBLY, TRIPLY OR QUADRUPLY CHARGED METAL CATION, MIXED PEROXIDE OR HYDROXO-PEROXIDE THUS OBTAINED AND USES THEREOF

CROSS-REFERENCE TO RELATED APPLICATIONS

This application is a U.S. national phase under the provisions of 35 U.S.C. § 371 of International Patent Application No. PCT/EP14/78400 filed Dec. 18, 2014, which in turn claims priority of French Patent Application No. 1363261 filed Dec. 20, 2013. The disclosures of such international patent application and French priority patent application are hereby incorporated herein by reference in their respective entireties, for all purposes.

TECHNICAL FIELD

The invention relates to the field concerning the synthesis of actinyl peroxides and hydroxo-peroxides More specifically, the invention relates to a process for synthesizing a mixed peroxide or hydroxo-peroxide of an actinyl, typically uranyl or neptunyl, and of at least one doubly, triply or quadruply charged metal cation.

The mixed peroxide or hydroxo-peroxide thus synthesized is able to be subsequently converted via calcining to a mixed oxide of an actinide and of at least one metal, the invention also relating for a process for synthesizing said oxide.

The invention further concerns a mixed peroxide or hydroxo-peroxide of an actinyl and of at least one doubly, triply or quadruply charged metal cation and to the use thereof for preparing a mixed oxide of an actinide and of at least this metal.

The invention finds particular application in the production of mixed oxides of actinides suitable for the manufacture of nuclear fuel pellets such as mixed oxides of uranium and plutonium $(U,Pu)O_2$, mixed oxides of uranium and neptunium $(U,Np)O_2$, mixed oxides of uranium and americium $(U,Am)O_2$, mixed oxides of uranium and curium $(U,Cm)O_2$, or mixed oxides of uranium, americium and curium $(U,Am,Cm)O_2$, or of transmutation targets.

It also finds application in the decontamination of radionuclide-contaminated effluents from nuclear plants such as effluents from clean-up treatments of plant installations or soils, or from reprocessing of spent nuclear fuels, in particular for decontamination from lanthanides and/or strontium.

STATE OF THE PRIOR ART

Natural uranyl peroxides are known. These are studtite of formula $UO_4.4H_2O$ or $(UO_2)(O_2).4H_2O$ and its dehydration product metastudtite of formula $UO_4.2H_2O$ or $(UO_2)(O_2).2H_2O$. It is acknowledged that these two peroxides are formed by hydrolysis of water to hydrogen peroxide. These are the sole peroxides of uranyl which do not contain any cation other than the uranium cation.

They can be laboratory-synthesized by adding hydrogen peroxide to a solution comprising uranyl nitrate in nitric or sulfuric acid, at ambient temperature for studtite and at 70° C. for metastudtite. They can also be obtained by direct conversion of $UO_3$ or $U_3O_8$ by hydrogen peroxide.

Mixed peroxides and hydroxo-peroxides of uranyl and singly charged ($Li^+$, $Na^+$, $K^+$, $Rb^+$, $Nb^+$ and $Cs^+$) or doubly charged ($Ca^{2+}$) metal cations as well as peroxides and hydroxo-peroxides in which uranyl is associated both with a singly charged metal cation and with a doubly charged metal cation ($K^+/Mg^{2+}$) are also known (Nyman et al., *InorganicChemistry* 2010, 49, 7748-7755, Reference [1]; Alcock et al., *Journal of the Chemical Society A: Inorganic, Physical, Theoretical* 1968, 1588, Reference [2]; Kubatko et al., *InorganicChemistry* 2007, 46, 3657-3662, Reference [3]; Unruh et al., *Inorganic Chemistry* 2009, 48, 2346-2348, Reference [4]).

These mixed peroxides and hydroxo-peroxides of uranyl and singly/doubly charged metal cations are synthesized using so-called «direct synthesis» processes whereby typically a uranyl salt is reacted with a salt or hydroxide of the singly/doubly charged metal cation in the presence of hydrogen peroxide.

It so happens that these processes do not work for the synthesis of mixed peroxides or hydroxo-peroxides of uranyl and triply or quadruply charged metal cations, and additionally that nobody to date has proposed an alternative process which would allow the synthesis of said peroxides or hydroxo-peroxides.

Yet, insofar as metal peroxides and hydroxo-peroxides are compounds able to be converted to metal oxides by calcining, it would be desirable to be able to synthesize mixed peroxides and hydroxo-peroxides of uranyl and triply or quadruply charged metal cations, and in particular of uranyl and actinides(III) or (IV) for the subsequent production, from these mixed peroxides, and hydroxo-peroxides of mixed oxides of uranium and actinides(III) or (IV) suitable for use in the manufacture of nuclear fuels.

The Inventors therefore set out to provide a process allowing the synthesis of mixed peroxides and hydroxo-peroxides of uranyl and triply or quadruply charged metal cations.

A further objective was to provide a process that is relatively simple to implement and has a cost compatible with operation on an industrial scale.

Yet, as part of their research, the Inventors ascertained that if a mixed peroxide or hydroxo-peroxide of uranyl and of at least one singly charged metal cation is contacted with a solution of a salt of a triply charged or quadruply charged metal cation, in fully surprising manner there occurs cationic exchange between the peroxide or hydroxo-peroxide and the salt so that the peroxide or hydroxo-peroxide with singly charged metal cation becomes a peroxide or hydroxo-peroxide with triply or quadruply charged metal cation.

They additionally found that this cation exchange also occurs if the salt, the solution of which is contacted with the peroxide or hydroxo-peroxide, is a salt of a doubly charged metal cation such as a strontium salt.

It is on these findings that the present invention is based.

DESCRIPTION OF THE INVENTION

The subject of the invention is therefore firstly a process for synthesizing a compound $C_1$ selected from mixed peroxides and hydroxo-peroxides of an actinyl and of at least one cation $X_1$, wherein:
the actinyl meets formula $AnO_2^{q+}$ where An is an actinide selected from uranium and neptunium, and q equals 1 (when An is neptunium(V)) or 2 (when An is uranium or neptunium(VI));

said at least one cation $X_1$ is a double, triply or quadruply charged metal cation, provided however that this metal differs from An;

which process comprises the reaction, in a solvent, of a salt of said at least one cation $X_1$, e.g. a nitrate, chloride or sulfate, with a compound $C_2$ selected from mixed peroxides and hydroxo-peroxides of the actinyl and of at least one singly charged cation $X_2$, whereby compound $C_2$ is converted to compound $C_1$ by replacement of said at least one cation $X_2$ by said at least one cation $X_1$.

It is to be understood that all the mixed peroxides and hydroxo-peroxides under consideration in the foregoing and in the remainder hereof can be in hydrated form, i.e. a form in which they are combined with molecules of water, or in anhydrous form.

As indicated in the foregoing, the actinyl may be a uranyl or neptunyl, preference being given to uranyl.

According to the invention, each cation $X_1$ may be a cation of any metal able to form a doubly charged cation, triply charged cation and/or quadruply charged cation. Therefore it may be:

- a cation of an alkaline-earth metal namely: $Be^{2+}$, $Mg^{2+}$, $Ca^{2+}$, $Sr^{2+}$, $Ba^{2+}$ or $Ra^{2+}$; or
- a cation of a post-transition metal, for example: $Al^{3+}$, $Ga^{3+}$, $In^{3+}$, $Sn^{2+}$, $Sn^{4+}$; $Tl^{3+}$; $Pb^{2+}$; $Pb^{4+}$ or $Bi^{3+}$; or
- a cation of a transition metal, for example: $Sc^{3+}$, $Ti^{4+}$, $V^{3+}$, $Cr^{3+}$, $Mn^{2+}$, $Mn^{3+}$, $Mn^{4+}$, $Fe^{2+}$, $Fe^{3+}$, $Co^{2+}$, $Co^{3+}$, $Ni^{2+}$, $Cu^{2+}$, $Zn^{2+}$, $Y^{3+}$, $Zr^{4+}$, $Nb^{3+}$, $Mo^{2+}$, $Mo^{3+}$, $Mo^{4+}$, $Tc^{4+}$, $Ru^{2+}$, $Ru^{3+}$, $Ru^{4+}$, $Rh^{2+}$, $Rh^{3+}$, $Rh^{4+}$, $Pd^{2+}$, $Cd^{2+}$, $Hf^{4+}$, $Ta^{3+}$, $Ta^{4+}$, $W^{3+}$, $W^{4+}$, $Re^{2+}$, $Re^{3+}$, $Re^{4+}$, $Os^{4+}$, $Ir^{3+}$, $Ir^{4+}$, $Pt^{2+}$, $Pt^{4+}$, $Au^{3+}$ or $Hg^{2+}$; or
- a cation of a lanthanide, for example: $La^{3+}$, $Ce^{3+}$, $Ce^{4+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$ or $Lu^{3+}$; or still
- a cation of an actinide, for example: $Ac^{3+}$, $Th^{4+}$, $Pa^{3+}$, $Pa^{4+}$, $U^{3+}$, $U^{4+}$, $Np^{3+}$, $Np^{4+}$, $Pu^{3+}$, $Pu^{4+}$, $Am^{3+}$ or $Cm^{3+}$.

Each singly charged cation $X_2$ may be any metal or non-metal, monoatomic or polyatomic singly charged cation. In particular, it may therefore be:

- a cation of alkaline metal, namely: $Li^+$, $Na^+$, $K^+$, $Rb^+$, $Cs^+$ and $Fr^+$; or
- a cation of a transition metal, for example: $Cu^+$, $Ag^+$, $Au^+$ and $Hg^+$; or still
- a polyatomic cation, for example: ammonium $NH_4^+$, alkylammonium such as methylammonium $(CH_3)NH_3^+$ or ethylammonium $(C_2H_5)NH_3^+$, dialkylammonium such as dimethylammonium $(CH_3)_2NH_2^+$ or diethylammonium $(C_2H_5)_2NH_2^+$, trialkylammonium such as trimethylammonium $(CH_3)_3NH^+$ or triethylammonium $(C_2H_5)_3NH^+$, tetraalkylammonium such as tetramethylammonium $(CH_3)_4N^+$ or tetraethylammonium $(C_2H_5)_4N^+$, hydrazinium $N_2H_5^+$, oxonium $H_3O^+$, or still hydroxylammonium $NH_4OH^+$.

According to the invention, the reaction of said at least one cation $X_1$ with compound $C_2$ is preferably performed by adding a solution of the salt of said at least one cation $X_1$ to compound $C_2$ and leaving the reaction mixture to stand preferably at ambient temperature for sufficient time to obtain the replacement of said at least one cation $X_2$ by said at least one cation $X_1$.

Typically, 15 to 60 minutes are sufficient to reach a quantitative reaction.

The solution of the salt of said at least one cation $X_1$ is advantageously an aqueous solution, this aqueous solution preferably being prepared with deionized water to prevent any cations which may be contained in the water from perturbing the replacement of said at least one cation $X_2$ by said at least one cation $X_1$.

After the reaction, compound $C_1$ can be recovered, for example by vacuum filtration, washed, for example in ethanol, and dried.

Preferably the process of the invention further comprises a synthesis of compound $C_2$.

This synthesis can be performed using any method proposed in the literature for the synthesis of a peroxide or hydroxo-peroxide of uranyl and of at least one singly-charged metal cation, or adapted from said method.

In particular, this synthesis can be performed using a method which comprises the reaction of a first aqueous solution comprising a salt of the actinide An, e.g. a nitrate, chloride or sulfate, with a n alkaline second aqueous solution comprising a salt or hydroxide of said at least one cation $X_2$ and hydrogen peroxide.

This reaction is preferably conducted by adding the first solution to the second under agitation and advantageously in a receptacle held at a temperature in the order of 0 to 5° C., and leaving the reaction medium obtained to stand for sufficient time, typically one to ten hours, to obtain formation of compound $C_2$.

After the reaction, $C_2$ can be recovered, for example by vacuum filtration, washed, for example in ethanol, and dried.

According to one preferred provision of the invention, compound $C_1$ meets following general formula (I):

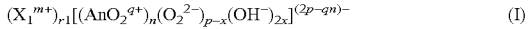  (I)

where:

An and q are such as previously defined;

m equals 2 (when $X_1$ is a double charged cation), 3 (when $X_1$ is a triply charged cation) or 4 (when $X_1$ is a quadruply charged cation);

n is an even integer, of 2 or higher;

x is an integer equal to 0 (when compound $C_1$ is a peroxide) or higher than 0 (when compound $C_1$ is a hydroxo-peroxide);

p is an integer higher than x; and n, p and r1 are such that:

$1.5 \leq p/n \leq 2$; and $0 < r1 = (2p-qn)/m$ (to heed the electroneutrality of compound $C_1$).

In which case, compound $C_2$ meets following general formula (II):

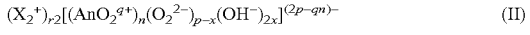  (II)

where:

An, q, n, x and p are such as previously defined; and $0 < r2 = 2p - qn$.

In the invention, it is preferred that, in above general formula (I) and, hence, above general formula (II), n should be an even integer ranging from 2 to 60 and better still from 16 to 60 (i.e. equaling 16, 18, 20, 22, 24, 26, 28, 30, 32, 34, 36, 38, 40, 42, 44, 46, 48, 50, 52, 54, 56, 58 or 60), in which case compound $C_1$ is in the form of an open or closed cluster formed of n actinyl ions linked by peroxo or di-hydroxo bridges.

Also, it is preferred that said at least one cation $X_1$ should be a cation of an actinide, in particular a uranium cation (if An itself is not uranium), neptunium (if An itself is not neptunium), plutonium, thorium, americium or curium, or else a cation of a lanthanide, in particular a neodymium, cerium, gadolinium or samarium cation, whether or not compound $C_1$ meets above general formula (I).

Finally, it is preferred that said at least one cation $X_2$ should be an ammonium cation, also whether or not compound $C_2$ meets above general formula (II). For this purpose, it is sufficient for example to use ammonia as source of said at least one cation $X_2$ for synthesis of compound $C_2$.

As previously mentioned, the metal peroxides and hydroxo-peroxides can be converted to oxides by calcining.

A further subject of the invention is therefore a process for synthesizing a mixed oxide of an actinide An selected from uranium and neptunium, and of at least one metal able to form a doubly, triply or quadruply charged cation, the metal differing from An, which process comprises:

synthesizing a mixed peroxide or hydroxo-peroxide of an actinyl of formula $AnO_2^{q+}$ where q equals 1 or 2, and of at least one doubly, triply or quadruply charged metal cation, using a process such as previously defined; and calcining the peroxide or hydroxo-peroxide thus synthesized.

This calcining can be performed under different conditions depending on the type of mixed oxide it is desired to obtain having regard to the intended use thereof.

For example, the Inventors have found that the calcining of a mixed hydroxo-peroxide of uranyl and neodymium leads to a mixed oxide when it is performed at a temperature in the order of 1 300 to 1 400° C. in air, whilst a mixed oxide having different oxygen stoichiometry is obtained when calcining is performed at a temperature in the order of 800 to 900° C. in a reducing atmosphere (e.g. $H_2/N_2$ 3/97 v/v).

Calcining conditions are therefore to be chosen as a function of the end use of the mixed oxide.

Among the mixed peroxides and hydroxo-peroxides able to be obtained using the synthesis process of the invention, those meeting above general formula (I) have never, to the knowledge of the Inventors, been described in the literature.

Therefore, a further subject of the invention is a mixed peroxide or hydroxo-peroxide of an actinyl and of at least one cation $X_1$, wherein:

the actinyl meets formula $AnO_2^{q+}$ where An is an actinide selected from uranium and neptunium, and q equals 1 or 2;

said at least one cation $X_1$ is a double, triply or quadruply charged metal cation, provided however that this metal differs from An;

which peroxide or hydroxo-peroxide meets following general formula (I):

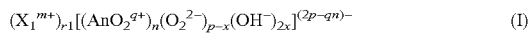

(I)

where:
m equals 2, 3 or 4;
n is an even integer, of 2 or higher;
x is an integer of 0 or higher;
p is an integer higher than x; and
n, p and r1 are such that $1.5 \leq p/n \leq 2$ and $0 < r1 = (2p-qn)/m$.

Here too, it is preferred that n should be an even integer ranging from 2 to 60 and better still from 16 to 60, as it is also preferred that said at least one tout cation $X_1$ should be a cation of an actinide, in particular a uranium, neptunium, plutonium, thorium, americium or curium cation, or else a cation of a lanthanide, in particular a neodymium, cerium, gadolinium or samarium cation.

A further subject of the invention is the use of a mixed peroxide or hydroxo-peroxide of an actinyl and at least one cation $X_1$, wherein:

the actinyl meets formula $AnO_2^{q+}$ where An is an actinide selected from uranium and neptunium, and q equals 1 or 2;

said at least one cation $X_1$ is a doubly, triply or quadruply charged metal cation, provided however that this metal differs from An;

which peroxide or hydroxo-peroxide is such as defined above;

for the synthesis of a mixed oxide of the actinide and of the metal.

Other characteristics and advantages of the invention will become better apparent on reading the remainder of the description below which relates to examples of synthesis of mixed peroxides and hydroxo-peroxides according to the invention and of mixed oxides by calcining these peroxides and hydroxo-peroxides.

Evidently these examples are only given to illustrate the subject of the invention and do not in any way limit this subject.

DETAILED DESCRIPTION OF PARTICULAR EMBODIMENTS

Figure 1:
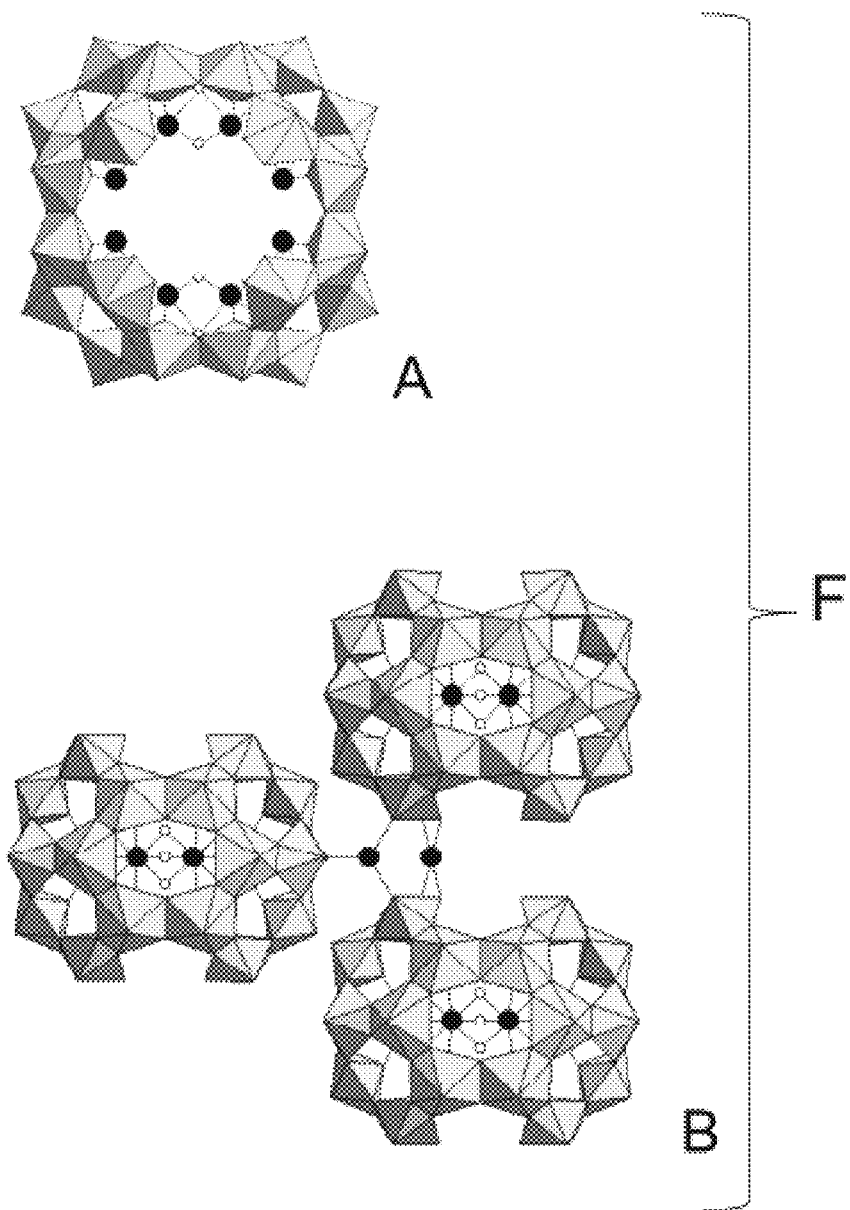
FIG. 1, parts A and B, illustrates the structure of a mixed hydroxo-peroxide of uranyl(VI) and neodymium(III) according to the invention, such as determined by single crystal X-ray diffraction of this hydroxo-peroxide.

Example 1: Synthesis of a Mixed Hydroxo-Peroxide of Uranium(VI) and Neodymium(III) and of Mixed Oxides of Uranium and Neodymium by Calcining this Hydroxo-Peroxide 1.1—Synthesis of the Mixed Hydroxo-Peroxide of Uranyl (VI) and Neodymium(III):

The mixed hydroxo-peroxide of uranyl(VI) and neodymium(III)—hereafter called U32R-Nd—of following particular formula (Ia):

$$Nd_{40/3}[(UO_2)_{32}(O_2)_{40}(OH)_{24}] \quad (Ia),$$

is synthesized in hydrated form by first synthesizing a mixed hydroxo-peroxide of uranyl(VI) and ammonium—hereafter called U32R-NH4—then substituting the ammonium cations of this hydroxo-peroxide by neodymium cations.

Synthesis of Hydroxo-Peroxide U32R-NH4:

A first aqueous solution of uranyl(VI) nitrate ($UO_2(NO_3)_2 \cdot 6H_2O$) is prepared by dissolving 0.5 g of this nitrate in 6 mL of deionized water. This solution contains 0.996 mmol uranium(VI).

In parallel, a second aqueous solution is prepared by mixing 4 mL of an aqueous solution comprising 4 mol/L ammonia ($NH_4OH$) with 3 mL of 30% v/v aqueous solution of hydrogen peroxide ($H_2O_2$). The solution obtained contains 16 mmol of ammonia and 29.37 mmol of hydrogen peroxide.

The first solution is added dropwise to the second under agitation, having placed the first solution over an ice bath. On completion of the addition, agitation is discontinued allowing rapid crystallisation of hydroxo-peroxide U32R-NH4. After 10 hours, crystallisation is quantitative.

The solid formed is recovered by vacuum filtration and washed in 5 mL ethanol.

Synthesis of Hydroxo-Peroxide U32R-Nd:

An aqueous solution of neodymium(III) nitrate ($Nd(NO_3)_3 \cdot 6H_2O$) is prepared by dissolving 0.218 g of this nitrate in 10 mL of deionized water. This solution contains 0.497 mmol neodymium(III).

This solution is poured into a beaker containing the solid previously obtained and left to stand.

Thirty minutes later, the solid is recovered by vacuum filtration and washed in 5 mL of ethanol. It is formed of a powder and a few single crystals.

The characterization of this solid given below shows that it is formed of a mixed hydroxo-peroxide of uranium(VI) and neodymium(III).

1.2—Synthesis of the Mixed Oxides of Uranium and Neodymium:

Two mixed oxides of uranium and neodymium—hereafter called oxides 1 and 2—are synthesized by calcining the hydroxo-peroxide U32R-Nd obtained under item 1.1 above.

Oxide 1 is obtained by performing this calcining in air at 1 400° C. for 12 hours (with temperature rise and decrease ramp rate of 300° C./h). It has the formula $U_{0.71}Nd_{0.29}O_{2+\delta}$, with ($\delta \geq 0$).

Oxide 2 is obtained by performing the calcining at 800° C., in a reducing atmosphere ($H_2/N_2$ 3:97 v/v, with temperature rise and decrease ramp rate of 300° C./hour without any temperature hold). It has the formula $U_{0.71}Nd_{0.29}O_{2+\delta}$, with ($\delta \geq 0$).

1.3—Characterization of Hydroxo-Peroxides U32R-NH4 and U32R-Nd:

Single Crystal XRD Analysis:

Analysis by single crystal X-ray diffraction of hydroxo-peroxide U32R-NH4 shows that this hydroxo-peroxide has a similar structure to that of the uranyl hydroxo-peroxide U32R-1 described by Sigmon et al., *Journal of the American Chemical Society* 2011, 131, 16648-16649, Reference [5], but differs therefrom in that it comprises a uranium atom in the centre of the U32R crown cluster.

Single crystal XRD analysis of hydroxo-peroxide U32R-Nd shows that this hydroxo-peroxide has a similar structure to that of hydroxo-peroxide U32R-NH4 but differs therefrom in that it comprises $Nd^{3+}$ ions to compensate the framework anion charge in replacement of the ammonium ions.

As can be seen in FIG. 1, parts A and B, in which the neodymium atoms are substantiated by black circles, these atoms are present both inside the U32R crown but also outside this crown. In addition they are linked to the U32R crown via the oxygens of the uranyl ions of the hydroxo-peroxide.

The Nd/U ratio determined with this analysis is 0.34.

Powder XRD Analysis:

As indicated in aforementioned Reference [5] for U32R-1 hydroxo-peroxide, hydroxo-peroxide U32R-NH4 very rapidly loses its crystallinity.

Figure 2:
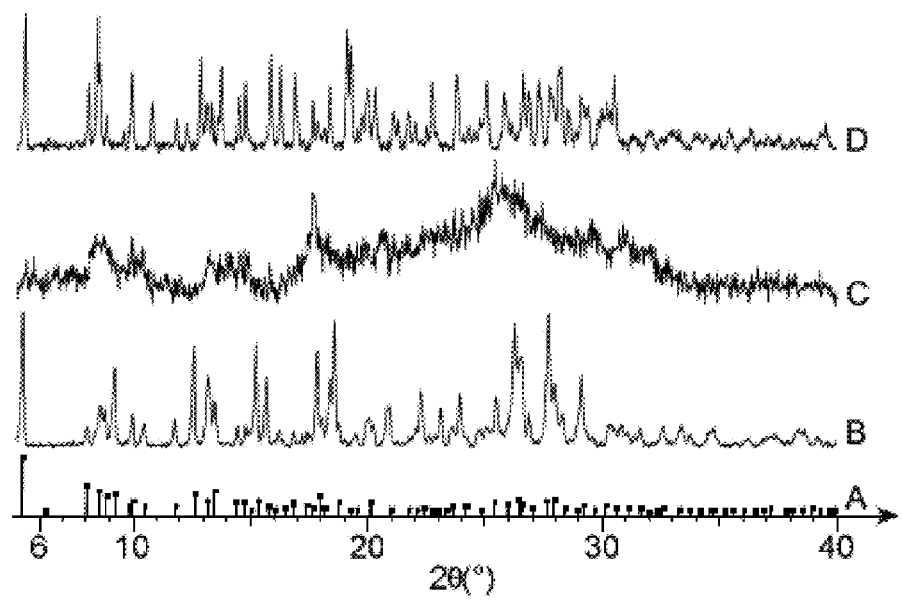
FIG. 2, parts A, B, C and D, illustrates powder X-diffractograms of a mixed hydroxo-peroxide of uranyl(VI) and ammonium (part A: diagram calculated from the structure; part B: diagram performed immediately after synthesis; part C: diagram performed one hour after synthesis) and of the mixed hydroxo-peroxide of uranyl(VI) and neodymium(III) whose structure shown in FIG. 1, performed one hour after synthesis (part D).

As can be seen in FIG. 2, parts A and B, powder XRD analysis performed 10 minutes after obtaining this hydroxo-peroxide nevertheless gives an X-diffractogram (part B) corresponding to the one calculated (part A) from the structure such as determined by single crystal X-ray diffraction. One hour after it has been obtained, hydroxo-peroxide U32R-NH4 has become practically amorphous (part C).

On the other hand, as shown by part D in FIG. 2, powder XRD analysis of hydroxo-peroxide U32R-Nd evidences much stronger crystallinity of this compound compared with that of hydroxo-peroxide U32R-NH4 and it is maintained over time due to inter-cluster links involving $Nd^{3+}$ ions that are stronger than those existing with ammonium ions.

ICP-AES and EDS Analyses:

Analysis by inductively coupled plasma atomic emission spectroscopy (ICP-AES) of hydroxo-peroxide U32R-Nd indicates a Nd/U ratio of 0.4.

Analysis by energy dispersive spectrometry (EDS) indicates a Nd/U ratio of 0.42.

These Nd/U ratios are slightly higher than the ratio obtained by single crystal X-ray diffraction which is 0.34, and can be accounted for:
- either by the presence of neodymium atoms in the single crystal occupying sites with low occupation rate and non-localised;
- or by under-estimated occupation rates;
- or still by the fact that the single crystals contain less neodymium than the whole powder.

Figure 3:
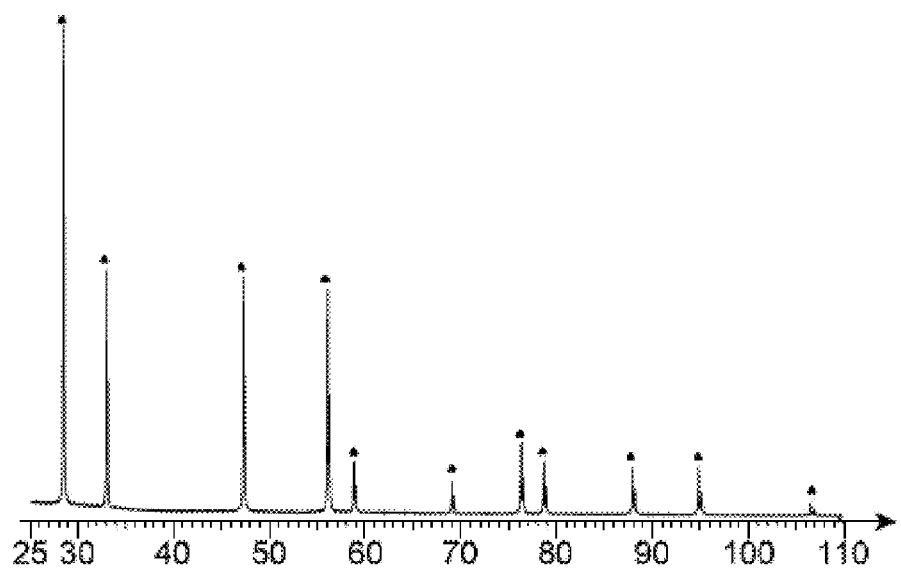
FIG. 3 gives the powder X-diffractogram of a mixed oxide of uranium and neodymium obtained by calcining, in air at 1 400° C., the mixed hydroxo-peroxide of uranyl(VI) and neodymium(III) whose structure is shown in FIG. 1.

1.4—Characterization of Oxide 1:

Powder XRD Analysis:

Powder XRD analysis of oxide 1 shows that this oxide is formed of a phase having a fluorine structure (FIG. 3).

The lattice parameter of this oxide (a=5.4356(7) Å) is slightly lower than that of uranium dioxide $UO_2$ (a=5,468(1) Å), indicating that the oxide is indeed a mixed oxide.

TGA and HTXRD Analyses:

The calcining temperature of 1 400° C. in air was set further to a study on the thermal decomposition of hydroxo-peroxide U32R-Nd that was carried out using thermogravimetric analysis (TGA) in air up to 1 300° C. (this corresponding to the maximum temperature of use of the equipment used) and by high temperature X-ray diffraction (HTXRD) in air up to 1 110° C. (this corresponding to the maximum temperature of use of the equipment used).

Figure 4:
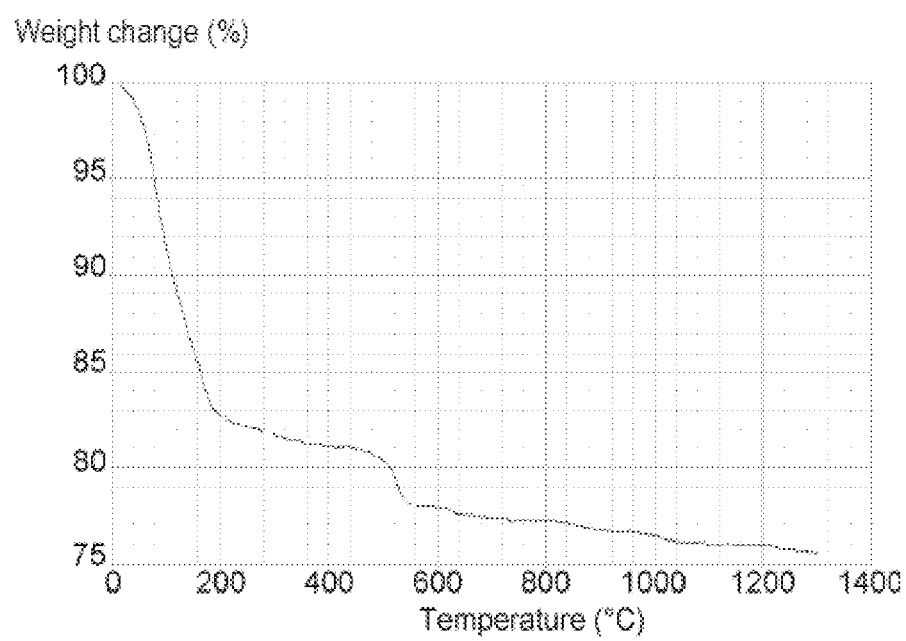
FIG. 4 gives the thermogravimetric curve such as obtained between 20 and 1 300° C. in air for the mixed hydroxo-peroxide of uranyl(VI) and neodymium(III) whose structure is shown in FIG. 1.

As shown by the gravimetric curve in FIG. 4, TGA analysis of this hydroxo-peroxide shows that its decomposition is not complete at 1 300° C., as confirmed by HTXRD analysis which specifies thermal decomposition mechanisms up to 1 100° C.

Figure 5:
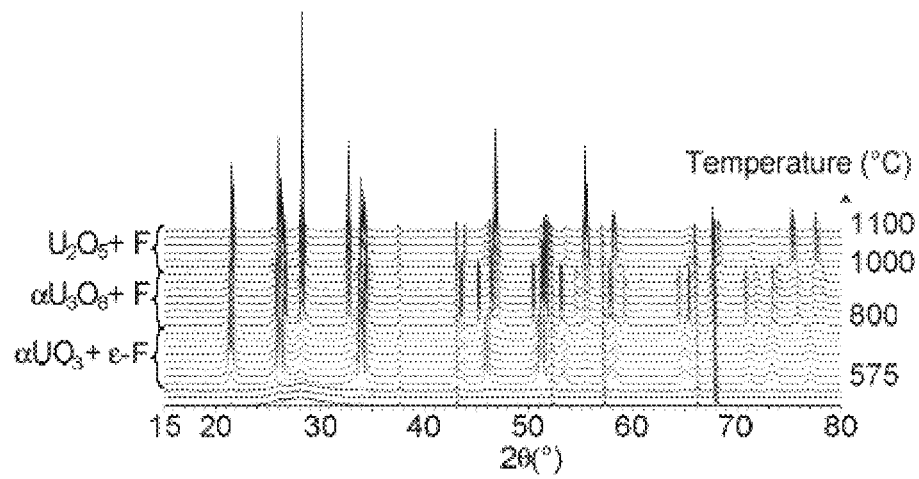
FIG. 5 gives the temperature X-diffractogram such as obtained between 500 and 1 100° C. in air for the mixed hydroxo-peroxide of uranyl(VI) and neodymium(III) whose structure is shown in FIG. 1.

Therefore, as shown by the X-diffractogram in FIG. 5, $\alpha$-$UO_3$ crystallises on and after 575° C. in a mixture with a small proportion of fluorine phase denoted F in this Figure. Then at 800° C., $\alpha$-$UO_3$ is converted to $\alpha$-$U_3O_8$ and the proportion of fluorine phase increases with temperature. Finally, $U_2O_5$ is obtained on and after 1 000° C. again in a mixture with a fluorine phase the quantity of which continues to increase with temperature.

ICP-AES Analysis:

ICP-AES analysis of oxide 1 indicates a Nd/U ratio of 0.42.

Analysis by Castaing Microprobe:

Mapping of a cross-section of the grains of oxide 1 is carried out using an electronic microprobe or Castaing microprobe on a pellet prepared by placing oxide 1 obtained under item 1.2 above in a resin, followed by polishing of this pellet.

This mapping confirms that this oxide 1 is—a mixed oxide of uranium and neodymium with the simultaneous presence of uranium and neodymium within one same grain.

Analysis by UV-Visible Spectrometry:

An aqueous solution prepared by dissolving oxide 1 in concentrated phosphoric acid ($H_3PO_4$, 65% v/v) is analysed by UV-visible spectrometry.

Figure 6:
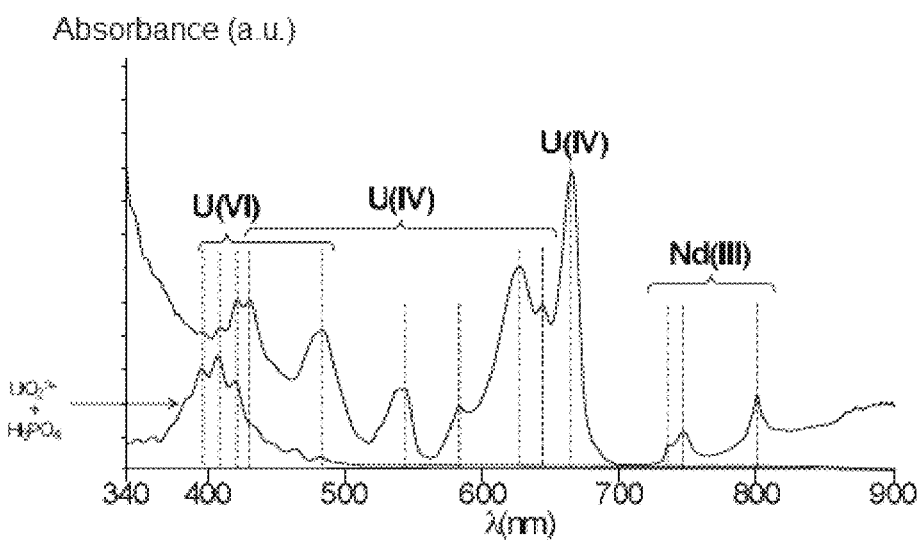
FIG. 6 gives the UV-visible spectrum of an aqueous solution prepared by dissolving in concentrated phosphoric acid a mixed oxide of uranium and neodymium obtained by calcining, at 1 400° C. in air, the mixed hydroxo-peroxide of uranyl(VI) and neodymium(III) whose structure is shown in FIG. 1.

As shown by the spectrum in FIG. 6, uranium is present in this oxide at oxidation degrees IV and VI to compensate for the neodymium charge in the oxide of fluorine structure $U_{0.71}Nd_{0.29}O_{2+\delta}$, with ($\delta \geq 0$).

To conclude: by calcining in air at 1 400° C. the hydroxo-peroxide U32R-Nd obtained under item 1.1 above, a fluorine phase is obtained which corresponds to a mixed stoichiometric oxide having a composition close to $U_{0.71}Nd_{0.29}O_{2+\delta}$, with ($\delta \geq 0$).

Figure 7:
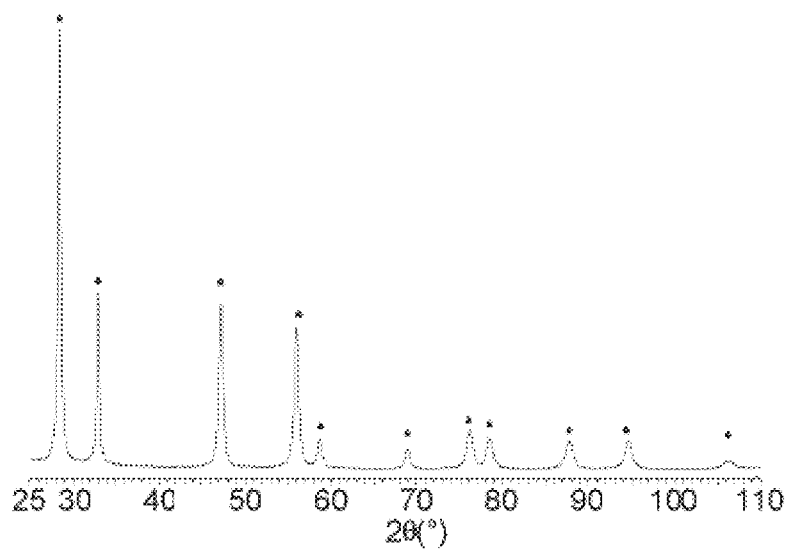
FIG. 7 gives the powder X-diffractogram of a mixed oxide of uranium and neodymium obtained by calcining, at 800° C. in a reducing atmosphere, the mixed hydroxo-peroxide of uranyl(VI) and neodymium(III) whose structure is shown in FIG. 1.

1.5—Characterization of Oxide 2:

Powder XRD Analysis:

Powder XRD analysis of oxide 2 shows that this oxide is formed of a phase having a fluorine structure (FIG. 7).

The lattice parameter of this oxide (a=5.4484(4) Å) is slightly lower than that of uranium dioxide $UO_2$ (a=5.468(1) Å), indicating the presence of a mixed oxide.

Widening of the beams (compared with FIG. 3) can be accounted for by the fact that oxide 2 has a smaller particle size than oxide 1 because sintering phenomena are less present at 800° C. than at 1400° C. In addition, oxide 2 was obtained by calcining without a temperature hold whereas the calcining which led to oxide 1 was conducted with a 12-hour temperature hold.

HTXRD Analysis:

HTXRD analysis of the hydroxo-peroxide U32R-Nd was performed up to 800° C., in a reducing atmosphere ($H_2/N_2$ 3/97 v/v).

Figure 8:
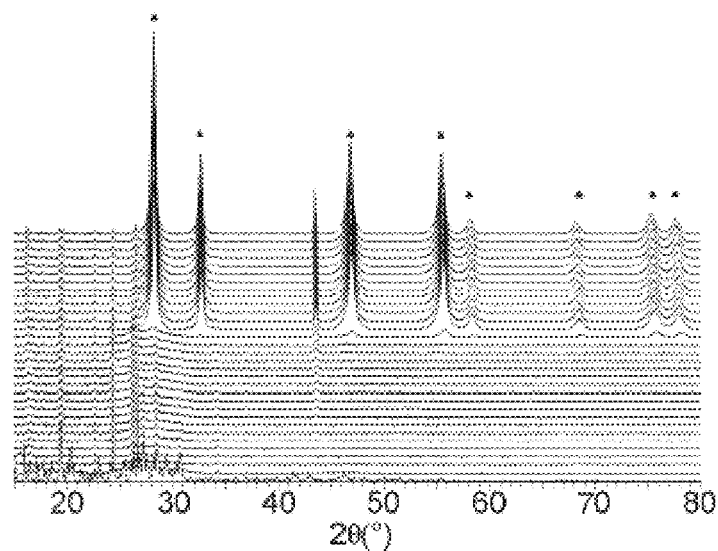
FIG. 8 gives the temperature X-diffractogram such as obtained between 20 and 800° C. in a reducing atmosphere for the mixed hydroxo-peroxide of uranyl(VI) and neodymium(III) whose structure is shown in FIG. 1.

As shown in the X-diffractogram in FIG. 8 it can be seen that on and after 500° C. there occurs crystallisation of a sub-stoichiometric oxide with fluorine structure $U_{0.71}Nd_{0.29}O_{2+\delta}$, with ($\delta \geq 0$)(▲). The beams between $2\theta$ values ranging from 15° to 27° and the beam at $2\theta=44°$ are those of the sample holder used for this analysis, namely a gold-leaf coated alumina crucible.

Analysis by UV-Visible Spectrometry:

An aqueous solution prepared by dissolving oxide 2 in concentrated phosphoric acid ($H_3PO_4$, 65% v/v) is analysed by UV-visible spectrometry.

Figure 9:
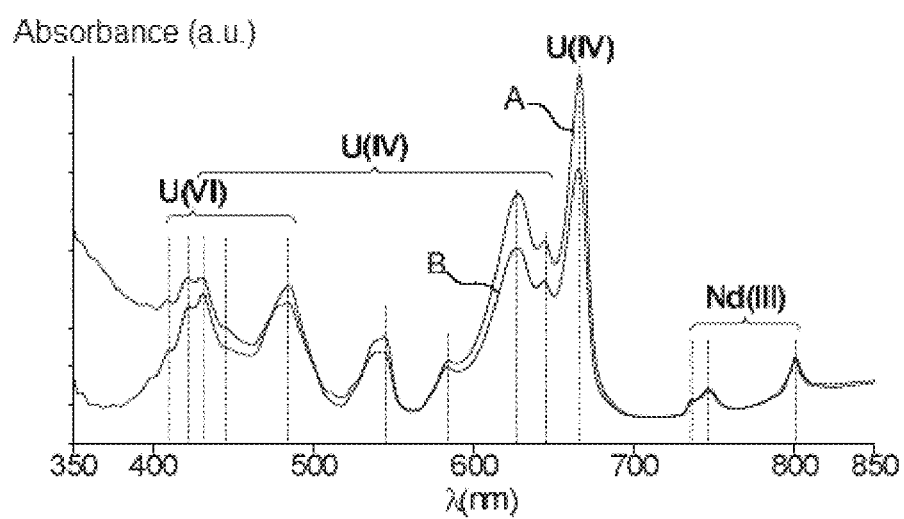
FIG. 9 gives the UV-visible spectrum (curve A) of an aqueous solution prepared by dissolving in concentrated phosphoric acid a mixed oxide of uranium and neodymium obtained by calcining, at 800° C. in a reducing atmosphere, the mixed hydroxo-peroxide of uranyl(VI) and neodymium (III) whose structure is shown in FIG. 1; for comparison purposes, this Figure also gives the UV-visible spectrum of FIG. 6 (curve B).

As shown in FIG. 9 which gives the UV-visible spectrum obtained for this solution (curve A) and the spectrum obtained for the solution of oxide 1 previously analysed under item 1.4 above (curve B), uranium is contained in the oxide at oxidation degrees IV and VI as in oxide 1.

However the proportion of uranium(IV) in oxide 2 is much higher than in oxide 1.

To conclude: by calcining at 800° C. in a reducing atmosphere the hydroxo-peroxide U32R-Nd obtained under item 1.1 ci-above, a fluorine phase is obtained which corresponds to a non-stoichiometric mixed oxide having a composition close to that of $U_{0.71}Nd_{0.29}O_{2+\delta}$, with ($\delta \geq 0$).

Example 2: Synthesis of a Mixed Hydroxo-Peroxide of Uranium(VI) and Thorium(IV)

2.1—Synthesis of the Mixed Hydroxo-Peroxide of Uranyl (VI) and Thorium(IV):

The mixed hydroxo-peroxide of uranyl(VI) and thorium (IV)—hereafter called U32R-Th—having following particular formula (Ib):

$$Th_{10}[(UO_2)_{32}(O_2)_{40}(OH)_{24}] \qquad (Ib),$$

is synthesized in hydrated form by substituting the ammonium cations of hydroxo-peroxide U32R-NH4 by thorium cations.

For this purpose, after synthesizing hydroxo-peroxide U32R-NH4 following the same operating protocol as described under item 1.1 above, an aqueous solution of thorium(IV) nitrate is prepared ($Th(NO_3)_4 \cdot 5H_2O$) by dissolving 0.285 g of this nitrate in 10 mL of deionized water. This solution contains 0.5 mmol of thorium(IV). It is poured into a beaker containing the hydroxo-peroxide U32R-NH4 previously obtained and left to stand. Thirty minutes later, the solid is recovered by vacuum filtration and washed in 5 mL ethanol.

The characterization of this solid given below shows that it is formed of a mixed hydroxo-peroxide of uranium(VI) and thorium(IV).

2.2—Characterization of Hydroxo-Peroxide U32R-Th:

Single crystal XRD analysis of hydroxo-peroxide U32R-Th shows that this hydroxo-peroxide has a similar structure to that of hydroxo-peroxide U32R-NH4 but differs from the latter in that it comprises $Th^{4+}$ ions to compensate the framework anion charge in replacement of the ammonium ions.

Figure 10:
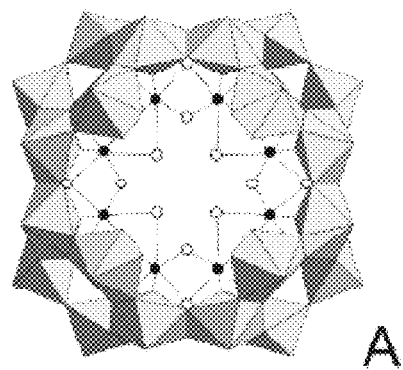
FIG. 10, parts A and B, illustrates the structure of a mixed hydroxo-peroxide of uranyl(VI) and thorium(IV) according to the invention, such as determined by single crystal X-ray diffraction of this hydroxo-peroxide.
Figure 10:
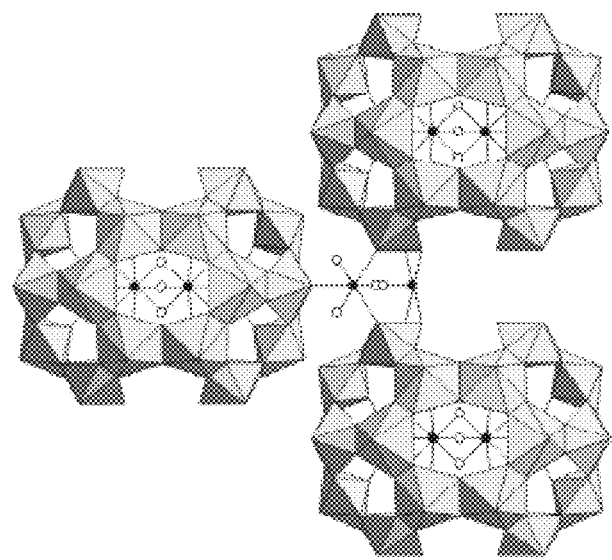

As can be seen in FIG. 10, parts A and B, in which the thorium atoms are substantiated by black circles, these atoms are present both inside the U32R crown cluster and outside this crown. In addition, they are linked to the U32R crown via the oxygens of the uranyl ions of the hydroxo-peroxide.

The Th/U ratio determined under structural resolution analysis is 0.20.

Example 3: Synthesis of a Mixed Hydroxo-Peroxide of Uranium(VI) and Strontium(II)

3.1—Synthesis of the Mixed Hydroxo-Peroxide of Uranyl (VI) and Strontium(II):

The mixed hydroxo-peroxide of uranyl(VI) and strontium (II)—hereafter called U32R-Sr—of following particular formula (Ic):

$$Sr_{20}[(UO_2)_{32}(O_2)_{40}(OH)_{24}] \quad (Ic),$$

is synthesized in hydrated form by substituting the ammonium cations of a hydroxo-peroxide U32R-NH4 by strontium cations.

For this purpose, after synthesizing hydroxo-peroxide U32R-NH4 following the same operating protocol as described under item 1.1 above, an aqueous solution of strontium(II) nitrate $(Sr(NO_3)_4)$ is prepared by dissolving 0.212 g of this nitrate in 20 mL of deionized water. This solution contains 1 mmol of strontium(II). It is poured into a beaker containing the hydroxo-peroxide U32R-NH4 previously obtained and left to stand. Thirty minutes later, the solid is recovered by vacuum filtration and washed in 5 mL of ethanol.

The characterization of this solid given below shows that it is formed of a mixed uranium(VI) and strontium(II) hydroxo-peroxide.

3.2—Characterization of Hydroxo-Peroxide U32R-Sr:

Single Crystal XRD Analysis:

Single crystal XRD analysis of hydroxo-peroxide U32R-Sr shows that this hydroxo-peroxide has a similar structure to that of hydroxo-peroxide U32R-NH4 but differs from the latter in that it comprises $Sr^{2+}$ ions to compensate the framework anion charge in replacement of the ammonium ions.

Figure 11:
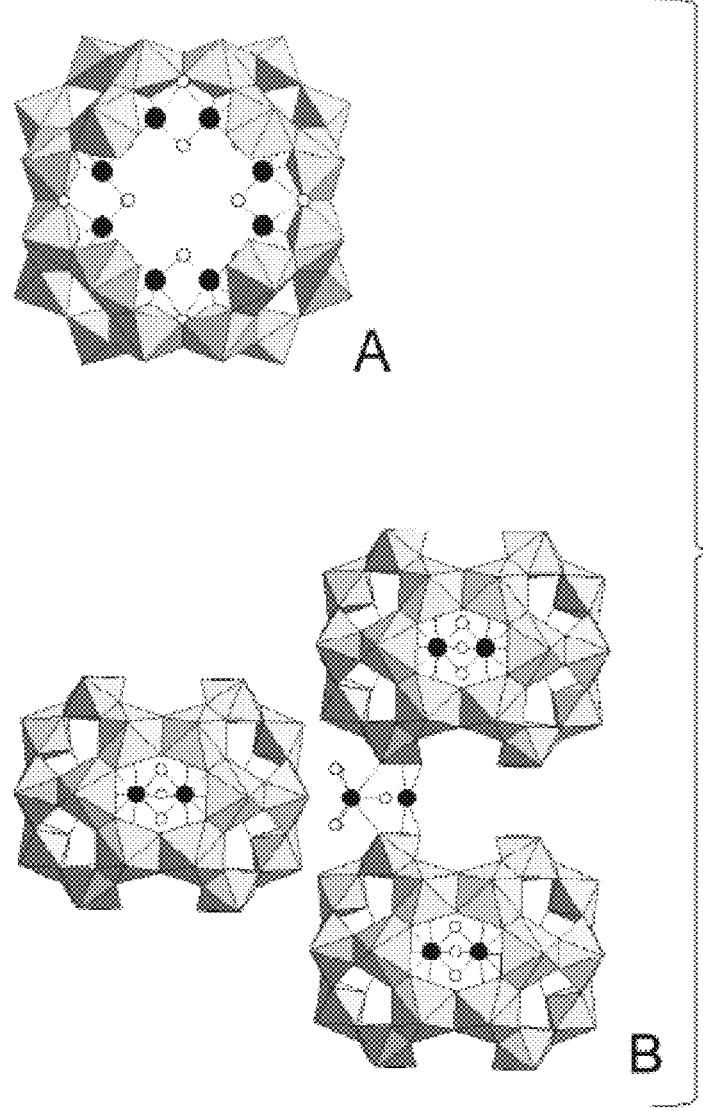
FIG. 11, parts A and B, illustrates the structure of a mixed hydroxo-peroxide of uranyl(VI) and strontium(II) according to the invention, such as determined by single crystal X-ray diffraction of this hydroxo-peroxide.

As can be seen in FIG. 11, parts A and B, in which the strontium atoms are substantiated by black circles, these atoms are present both inside the U32R crown and also outside this crown. In addition, they are linked to the U32R crown via the oxygens of the uranyl ions of the hydroxo-peroxide.

The Sr/U ratio determined under structural resolution analysis is 0.42.

ICP-AES Analysis:

ICP-AES analysis of hydroxo-peroxide U32R-Sr gives a Sr/U ratio of 0.51.

Example 4: Synthesis of a Mixed Peroxide of Uranium(VI) and Neodymium(III) and of a Mixed Oxide of Uranium and Neodymium by Calcining this Peroxide 4.1—Synthesis of the Mixed Peroxide of Uranyl(VI) and Neodymium(III):

The mixed peroxide of uranyl(VI) and neodymium(III)—hereafter called U28-Nd—of following particular formula (Id):

$$Nd_{20}[(UO_2)_{28}(O_2)_{42}] \quad (Id),$$

is synthesized in hydrated form by first synthesizing a mixed peroxide of uranyl(VI) and ammonium—hereafter called U28-NH4—then substituting the ammonium cations of this peroxide by neodymium cations.

Synthesis of U28-NH4 Peroxide:

A first aqueous solution is prepared comprising 0.067 mol/L of uranyl(VI) nitrate $(UO_2(NO_3)_2.6H_2O)$ by dissolving 0.625 g of this nitrate in 18.75 mL of deionized water, and 0.093 mol/L of ammonium oxalate $((NH_4)_2C_2O_4.H_2O)$ by dissolving 0.250 g of this oxalate in the preceding mixture. The solution obtained contains 1.25 mmol of uranium(VI) and 1.75 mmol of ammonium.

In parallel, a second aqueous solution is prepared comprising 1 mol/L of hydrogen peroxide by diluting 638 µL of 30% v/v hydrogen peroxide in 6.25 mL of deionized water. The solution obtained contains 6.25 mmol of hydrogen peroxide.

Under agitation in a beaker, the second solution is added to the first. The pH of the reaction mixture being about 1.43, it is adjusted to 8 by adding 7.9 mL of 1M ammonia under agitation. The beaker is transferred to a hermetically sealed jar containing 33 mL methanol, allowing crystallisation of U28-NH4 peroxide by vapour diffusion and solvent modification.

After two weeks, a solid corresponding to a mixture of powder and crystals is formed at the bottom of the beaker and is recovered by vacuum filtration and washed in 5 mL ethanol.

Synthesis of U28-Nd Peroxide:

An aqueous solution of neodymium(III) nitrate $(Nd(NO_3)_3.6H_2O)$ is prepared by dissolving 0.218 g of this nitrate in 10 mL of deionized water. This solution contains 0.497 mmol of neodymium(III).

This solution is poured into a beaker containing the U28-NH4 peroxide previously obtained and left to stand.

Thirty minutes later, the solid is recovered by vacuum filtration and washed in 5 mL ethanol.

The characterization of this solid given below shows that it is formed of a mixed peroxide of uranium(VI) and neodymium(III).

4.2—Synthesis of the Mixed Oxide of Uranium and Neodymium

A mixed oxide of uranium and neodymium—hereafter called oxide 3—is synthesized by calcining the U28-Nd peroxide obtained under item 4.1 above in air, at 1 400° C. for 12 hours (with a temperature rise and decrease ramp rate of 300° C./h).

This oxide has the formula $U_{0.73}Nd_{0.27}O_{2+\delta}$, with ($\delta \geq 0$).

4.3—Characterization of Peroxides U28-NH4 and U28-Nd:

Single Crystal XRD Analysis:

Single crystal XRD analysis of U28-NH4 peroxide shows that this peroxide has a structure similar to that of the uranyl peroxide U28 described by Burns et al., *Angewandte Chemie*

*International Edition* 2005, 44, 2135-2139, Reference [6]: it is a sphere with 28 uranium atoms composed of triperoxide bricks, the neutrality thereof being ensured by the ammonium ions.

Powder XRD Analysis:

U28-NH4 peroxide loses its crystallinity very rapidly.

Figure 12:
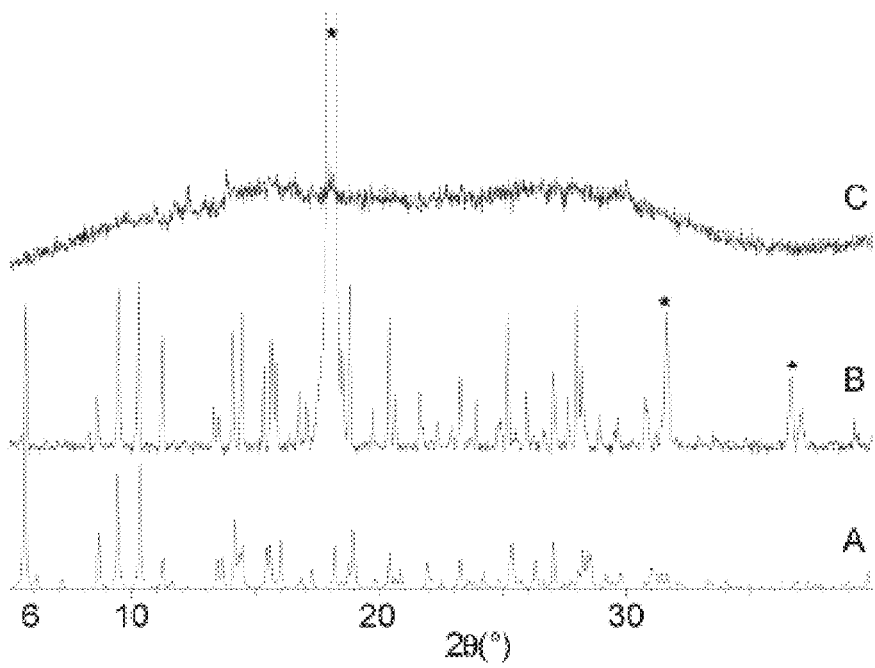
FIG. 12, parts A, B and C, gives the powder X-diffractograms of a mixed peroxide of uranyl(VI) and ammonium (parts A and B) and of a mixed peroxide of uranyl(VI) and neodymium(III) according to the invention (part C), obtained by substitution of the ammonium ions of said peroxide by neodymium ions.

As can be seen in FIG. 12 parts A and B, powder XRD analysis performed 10 minutes after obtaining this peroxide nevertheless gives an X-diffractogram (part B) corresponding to the one calculated (part A) from the structure such as determined by single-crystal X-ray diffraction. In part B, the beams substantiated by a star (*) are those of the sample holder in polytetrafluoroethylene used for this analysis.

Figure 13:
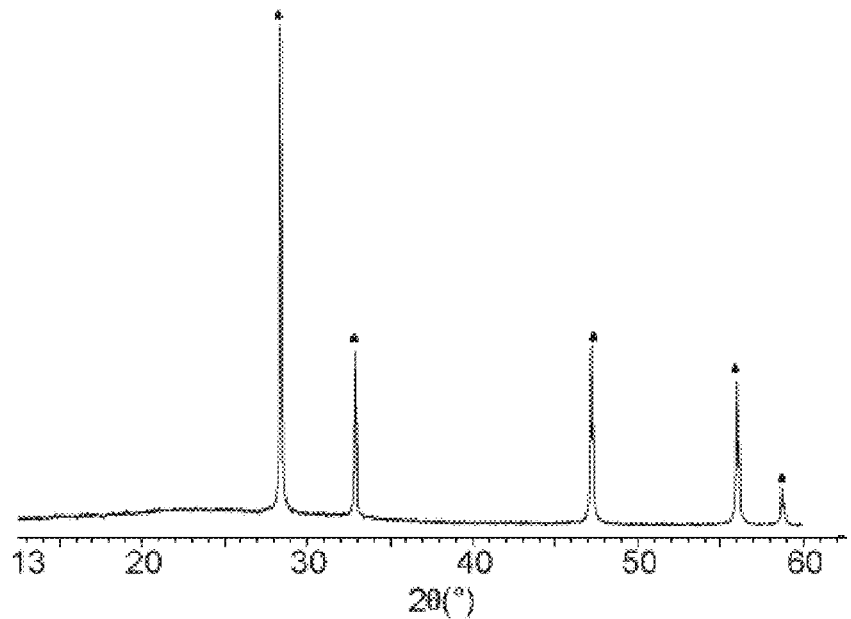
FIG. 13 gives the powder X-diffractogram of a mixed oxide of uranium and neodymium obtained by calcining, in air at 1 400° C., a mixed peroxide of uranyl(VI) and neodymium(III) according to the invention.

As can be seen in FIG. 13, part C, powder XRD analysis of U28-Nd peroxide shows that it is amorphous.

ICP-AES Analysis:

ICP-AES analysis of U28-Nd peroxide gives a Nd/U ratio of 0.369.

4.4—Characterization of the Mixed Oxide of Uranium and Neodymium:

Powder XRD analysis of oxide 3 shows that this oxide is formed of a phase having a fluorine structure (FIG. 13).

The lattice parameter of this oxide (a=5.434(4) Å) is slightly lower than that of uranium dioxide $UO_2$ (a=5.468(1) Å), indicating that this is indeed a mixed oxide.

To conclude: by calcining in air at 1 400° C. the U28-Nd peroxide obtained under item 4.2 above, a fluorine phase is obtained which corresponds to a mixed oxide having a composition close to $U_{0.73}Nd_{0.27}O_{2+\delta}$, with ($\delta \geq 0$).

CITED REFERENCES

[1] Nyman et al., *Inorganic Chemistry* 2010, 49, 7748-7755
[2] Alcock et al., *Journal of the Chemical Society A: Inorganic, Physical, Theoretical* 1968, 1588
[3] Kubatko et al., *Inorganic Chemistry* 2007, 46, 3657-3662
[4] Unruh et al., *Inorganic Chemistry* 2009, 48, 2346-2348
[5] Sigmon et al., *Journal of the American Chemical Society* 2011, 131, 16648-16649
[6] Burns et al., *AngewandteChemie International Edition* 2005, 44, 2135-2139

The invention claimed is:

1. A process for synthesizing a compound $C_1$ selected from the group consisting of mixed peroxides and hydroxo-peroxides of an actinyl and of at least one cation $X_1$, wherein:
the actinyl has formula $AnO_2^{q+}$ where An is an actinide selected from the group consisting of uranium and neptunium, and q equals 1 or 2;
the cation $X_1$ is a doubly, triply or quadruply charged metal cation, wherein the metal differs from An;
which process comprises a reaction in a solvent of a salt of the cation $X_1$ with a compound $C_2$ selected from the group consisting of mixed peroxides and hydroxo-peroxides of the actinyl and of at least one singly charged cation $X_2$, whereby compound $C_2$ is converted to compound $C_1$ by a replacement of the cation $X_2$ by the cation $X_1$.

2. The process of claim 1, wherein the cation $X_1$ is a cation of an alkaline-earth metal, a cation of a post-transition metal, a cation of a transition metal, a cation of a lanthanide or a cation of an actinide.

3. The process of claim 2, wherein the cation $X_2$ is a cation of an alkaline metal, a cation of a transition metal or a polyatomic cation.

4. The process according to claim 1, wherein the reaction of the cation $X_1$ with compound $C_2$ comprises adding a solution of the salt of the cation $X_1$ to compound $C_2$ to obtain a reaction medium, and leaving the reaction medium to stand for sufficient time to obtain the replacement of the cation $X_2$ by the cation $X_1$.

5. The process of claim 4, wherein the solution of the salt of the cation $X_1$ is an aqueous solution.

6. The process of claim 1, further comprising a synthesis of compound $C_2$.

7. The process of claim 6, wherein the synthesis of compound $C_2$ comprises a reaction of a first aqueous solution comprising a salt of the actinide An with an alkaline second aqueous solution comprising a salt or hydroxide of the cation $X_2$ and hydrogen peroxide.

8. The process of claim 7, wherein the synthesis of compound $C_2$ comprises adding the first solution to the second solution under agitation to obtain a reaction medium and leaving the reaction medium to stand for sufficient time to obtain the formation of compound $C_2$.

9. The process of claim 1, wherein compound $C_1$ has general formula (I):

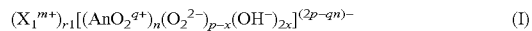

where:
m equals 2, 3 or 4;
n is an even integer of 2 or higher;
x is an integer of 0 or higher;
p is an integer higher than x; and
n, p and r1 are such that $1.5 \leq p/n \leq 2$ and $0 < r1 = (2p-qn)/m$.

10. The process of claim 9, wherein compound $C_2$ has general formula (II):

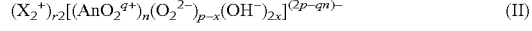

where:
$0 < r2 = 2p-qn$.

11. The process of claim 9, wherein n is an even integer ranging from 2 to 60.

12. The process of claim 1, wherein the cation $X_1$ is a cation of an actinide or lanthanide.

13. The process of claim 1, wherein the cation $X_2$ is an ammonium cation.

14. A process for synthesizing a mixed oxide of an actinide An selected from the group consisting of uranium and neptunium, and of at least one metal able to form a doubly, triply or quadruply charged metal cation $X_1$, the metal differing from An, which process comprises:
synthesizing a mixed peroxide or hydroxo-peroxide of an actinyl of formula $AnO_2^{q+}$ where q equals 1 or 2, and of at least the cation $X_1$, the synthesis comprising a reaction in a solvent of a salt of the cation $X_1$ with a compound $C_2$ selected from the group consisting of mixed peroxides and hydroxo-peroxides of the actinyl and of at least one singly charged cation $X_2$, whereby compound $C_2$ is converted to compound $C_1$ by a replacement of the cation $X_2$ by the cation $X_1$; and
calcining the mixed peroxide or hydroxo-peroxide thus synthesized.

15. A mixed peroxide or hydroxo-peroxide of an actinyl and of at least one cation $X_1$, wherein:
the actinyl has formula $AnO_2^{q+}$ where An is an actinide selected from the group consisting of uranium and neptunium, and q equals 1 or 2;
the cation $X_1$ is a doubly, triply or quadruply charged metal cation, wherein the metal differs from An;
the peroxide or hydroxo-peroxide has following general formula (I):

where:
m equals 2, 3 or 4;
n is an even integer of 2 or higher;
x is an integer of 0 or higher;
p is an integer higher than x; and
n, p and r1 are such that $1.5 \leq p/n \leq 2$ and $0 < r1 = (2p-qn)/m$.

16. The peroxide or hydroxo-peroxide of claim 15, wherein n is an even integer ranging from 2 to 60.

17. The peroxide or hydroxo-peroxide of claim 15, wherein the cation $X_1$ is a cation of an actinide or lanthanide.

18. The process of claim 10, wherein n is an even integer ranging from 2 to 60.

* * * * *